(No Model.) 2 Sheets—Sheet 2.

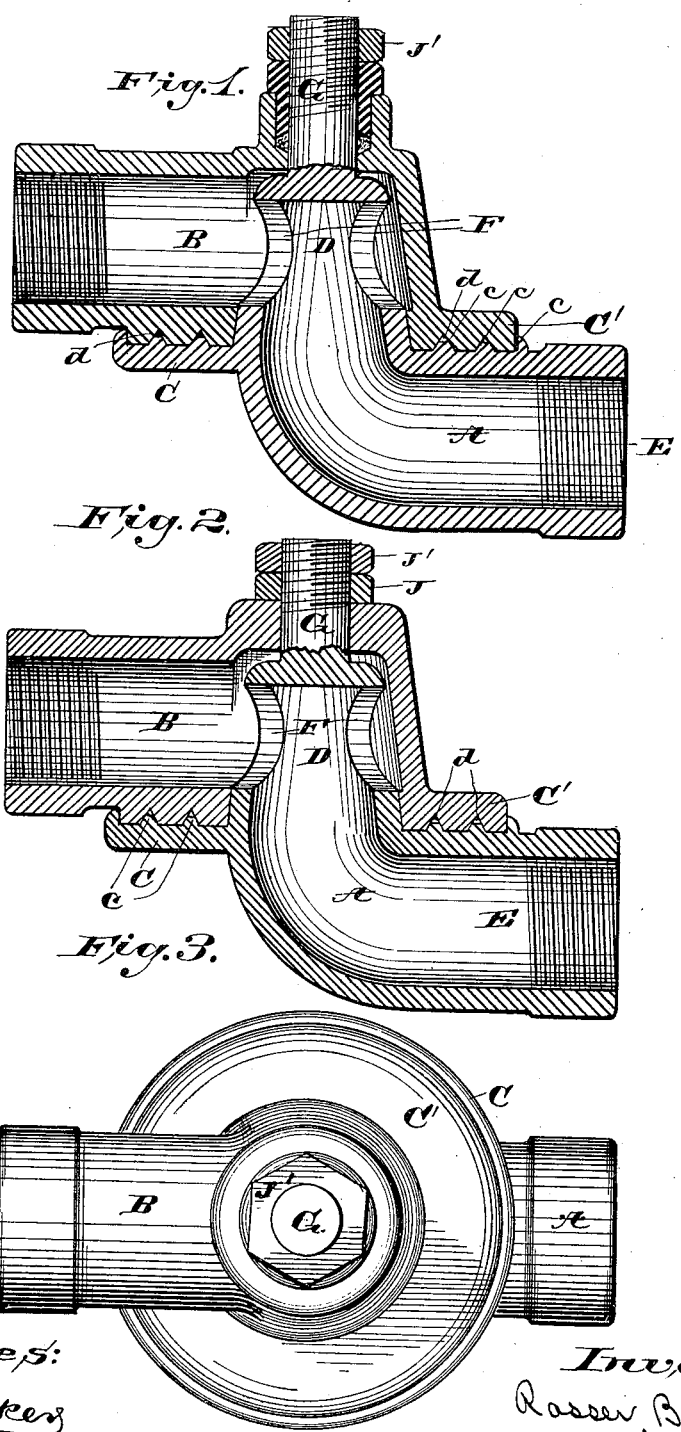

R. BODYCOMB.
FLEXIBLE PIPE COUPLING.

No. 388,112. Patented Aug. 21, 1888.

Witnesses:
E. T. Walker
Wm. E. Dyre.

Inventor,
Rosser Bodycomb,
By his Attys.
Whitaker & Prevost.

UNITED STATES PATENT OFFICE.

ROSSER BODYCOMB, OF WILKES-BARRÉ, PENNSYLVANIA.

FLEXIBLE PIPE-COUPLING.

SPECIFICATION forming part of Letters Patent No. 388,112, dated August 21, 1888.

Application filed November 14, 1887. Serial No. 255,361. (No model.)

*To all whom it may concern:*

Be it known that I, ROSSER BODYCOMB, a citizen of the United States, residing at Wilkes-Barré, in the county of Luzerne and State of Pennsylvania, have invented certain new and useful Improvements in Flexible Pipe-Couplings; and I do hereby declare the following to be a full, clear, and exact description of the invention, such as will enable others skilled in the art to which it appertains to make and use the same.

My invention relates to flexible pipe-couplings for use on railroad-cars for connecting the steam, air, and water pipes of one car with the corresponding pipes of the adjacent car; or it may be used in any pipe where it is found desirable to use a flexible joint.

Flexible connections of this general character have been constructed, but they have all failed to provide for the twisting of the pipes occasioned by the cars being in different vertical angles, such as would occur when the cars pass from a curve to a straight track, or from one curve to another. Consequently the joints soon become injured and loose by the strain and give very unsatisfactory results.

To overcome this is the object of my invention, and also to furnish a flexible coupling which will be reliable and one that will readily adapt itself to the varying motions of the cars in every direction.

It consists of certain novel features of construction and combinations of parts, which will be fully described in the ensuing specification, and distinctly pointed out in the claim at the close thereof.

Figure 4:
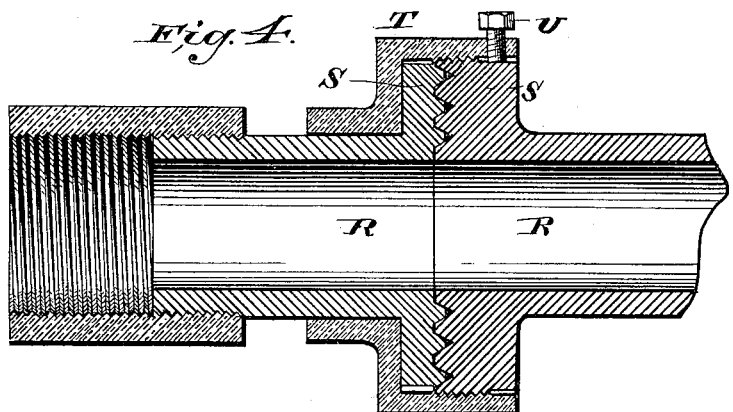
Figure 6:
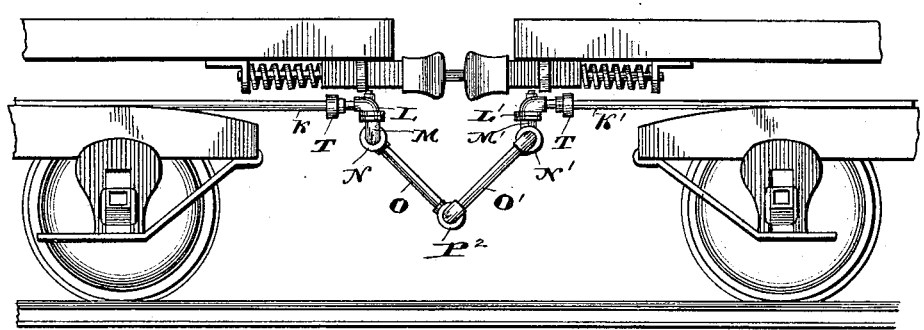
Figure 5:
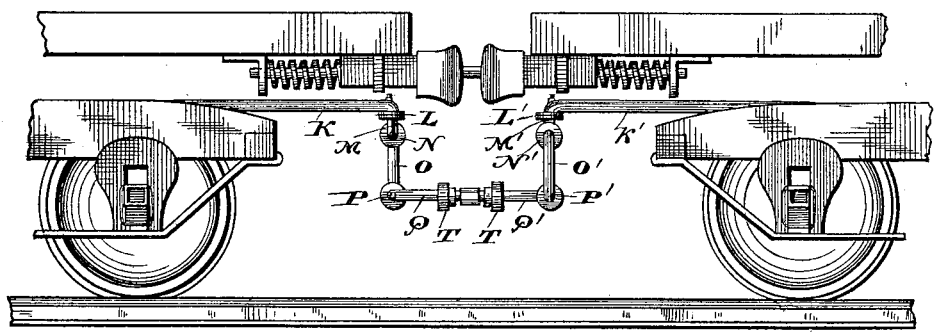

In the drawings, Figure 1 is a vertical longitudinal section of my improved flexible pipe-coupling. Fig. 2 is a similar view of another form with the stuffing-box omitted. Fig. 3 is a top view of Fig. 1. Fig. 4 is a vertical longitudinal section of a swivel-joint for providing for twist in the pipes. Figs. 5 and 6 show two forms of the application of my invention to railroad-cars.

The same letters of reference indicate identical parts in all the figures.

In the drawings, A and B represent the shells of the couplings. The shell A is made, preferably, in the form of a curved or angular joint having a flange, C, surrounding the arm D of the same and lying, preferably, in line with one side of the arm E, as shown in the drawings, the upper face of said flange having inverted-V-shaped ribs $c\ c\ c$ formed thereon concentric with the arm D. The arm D of the angular joint A is made slightly tapering from the disk C, and is closed at its end, said closed end being provided with a short screw-threaded bolt, which is cast or otherwise formed thereon. The tapering end D is provided with large openings F F in its sides, in line with the bore of the shell B, to allow the steam, water, gas, air, &c., to flow freely through the same. The shell B is closed at one end, and is provided on one side with a disk, C', having concentric grooves $d\ d$ on its face, corresponding to the ribs $c\ c$ on the flange C. In the center of this disk is a circular opening, H, for the reception of the tapering end of the shell A, and in the side of the shell B opposite the opening H is a smaller opening, I, for the passage of the screw-threaded bolt, G. This opening is provided with a stuffing-box, to prevent the escape of steam or water when the shells A and B are coupled together. The open ends of the shells A and B are each provided with internal screw-threads for connection with the main pipe under the cars. Where the two shells are coupled together, they are securely held in place by means of the jam-nut J.

In applying my improved coupling to railroad-cars I construct the flexible connection between the cars as follows:

To the ends of the rigid pipes K K' are fitted one of my improved joints L L', placed in a horizontal position to provide for lateral motion of the cars in turning curves. Next to these joints L L' are short pipes M M', provided with the joints N N'; then another short section of pipe, O O', also provided with the joints P P', and finally the sections of pipe Q Q', which are connected by means of any convenient swivel-joint that will provide for twist in the pipes, such as occurs when the adjacent cars stand on different vertical angles. The joints N N' and P P' are placed in a vertical position to provide for variation in the distance between the cars, such as is occasioned in starting and stopping the train. The joint which I prefer to use for this purpose is shown in Fig. 4, and is composed of the two shells R R', each provided with annular flanges S S'. The face of the flange S has concentric grooves for the reception of corresponding ribs, $s'$, on the adjacent face of the flange S'. The shell R' is provided with a collar, T, which fits snugly around the small portion of the shell R', and is provided with an enlarged portion, T', which is internally screw-threaded to correspond with the screw-thread on the periphery of the flange S of the shell R, and thereby hold the two shells in an air-tight engagement. When the two shells are clamped together, the collar is secured rigidly to the flange S by means of the set-screw U.

In Fig. 6 I have shown another form of flexible joint or connection between cars. In this case I dispense with the sections of pipe Q Q' and the joints P P' and connect the sections O O' together with one of my joints P². I also place the joints T T in the rigid pipes K K', intermediate the ends thereof and the horizontal joints L L'.

I have described my coupling as being provided with a stuffing-box for the bolt G; but I may construct it without the stuffing-box, if found more desirable, and use merely a tightening-nut, J, and jam-nut J', as shown in Fig. 2.

While I have shown and described the flange C as being in line with the side of the arm E of the shell A, it is obvious that it may be at any convenient point on the arm D; or the shell A, instead of being constructed in the form of an angular joint, may be made straight without departing from the spirit of my invention.

What I claim, and desire to secure by Letters Patent, is—

In a pipe-coupling, the combination of the two shells A and B, each provided with an annular flange in line with one wall of said shell, the said flanges being the one provided with V-shaped recesses and the other with annular projections fitting the recesses of the other, the said shell A also having the tapering projection provided with openings in the sides thereof and an attaching-bolt, the shell B being provided with the stuffing-box around the said bolt, and the nuts J J', substantially as described.

In testimony whereof I affix my signature in presence of two witnesses.

ROSSER BODYCOMB.

Witnesses:
M. T. REES,
GWELYM M. EVANS.